H. C. Harris. Cotton Seed Planter and Fertilizer Distributor.

No. 100526 — Patented Mar. 8, 1870.

Witnesses:
A. W. Almquist
Thos. F. Brooks

Inventor:
H. C. Harris
per ——— Attorneys.

United States Patent Office.

HENRY C. HARRIS, OF FORT VALLEY, GEORGIA.

Letters Patent No. 100,526, dated March 8, 1870.

IMPROVEMENT IN COTTON-SEED PLANTER AND FERTILIZER DISTRIBUTER.

The Schedule referred to in these Letters Patent and making part of the same.

*To all whom it may concern:*

Be it known that I, HENRY C. HARRIS, of Fort Valley, in the county of Houston, and State of Georgia, have invented a new and useful Improvement in Cotton-Seed Planter and Fertilizer Distributer; and I do hereby declare that the following is a full, clear, and exact description thereof, which will enable others skilled in the Art to make and use the same, reference being had to the accompanying drawings forming part of this specification, in which—

Similar letters of reference indicate corresponding parts.

My invention has for its object to furnish a simple, convenient, reliable, and effective machine for planting cotton and other seeds, and for distributing guano and other fine fertilizer; and It consists in the construction and combination of various parts of the machine, as hereinafter more fully described.

A is the frame of the machine, to the forward end of which is attached the draw-bar B.

C is the furrowing-plow, the standard D of which passes up through a slot in the rear end of the draw-bar B, and through slots in the plates E, attached to the upper and lower sides of the said draw-bar B.

Upon the forward edge of the standard D are formed notches or teeth $d$ which take hold of the plate or plates E, to hold the said standard securely in place.

Figure 2:
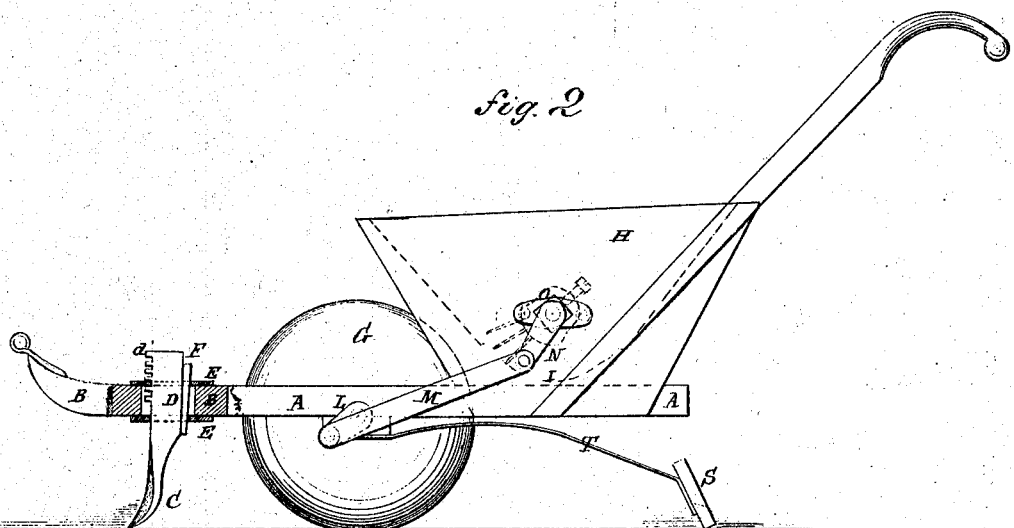
Figure 2 is a side view of the same, part being broken away to show the construction.

The standard D is forced forward, so that its teeth $d$ may take hold of the plate or plates E, by the wedge-key F, which is driven into the slot of the bar B, and plates E along the rear edge of the said standard D, as shown in fig. 2.

G is a wheel, the face of which is rounded off, or made somewhat V-shaped, to press open the furrow formed by the plow C D.

The wheel G is placed directly in the rear of the plow C D, and its journals revolve in bearings attached to the side bars of the frame A.

H is the seed-box or hopper, which is attached to the rear part of the frame A, as shown in fig. 2.

Figure 1:
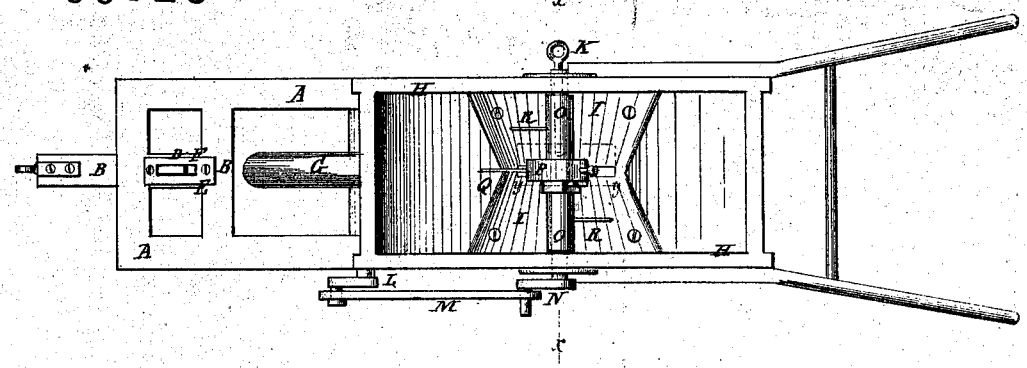
Figure 1 is a top view of my improved machine.
Figure 3:
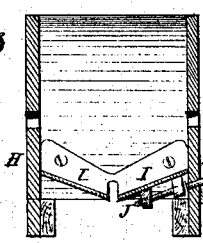
Figure 3 is a vertical cross-section of the same, taken through the line $x\ x$, fig. 1.
Figure 4:
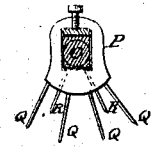
Figure 4 is a detail sectional view of the agitator, taken through the line $y\ y$, fig. 1.

The bottom I of the hopper H is made concave upon its upper side, as shown in figs. 1 and 3, and in dotted lines in fig. 2, may be made in one or two pieces, and has a long slot formed in its middle or lowest part, as shown in figs. 1 and 3, for the escape of the seed.

The size of the slot, through the bottom I, is regulated as required, by a plate, J, fitted upon its lower side, and which is moved forward and back to adjust the size of the slot, or to close and open it by the screw K.

The screw K is swiveled to the side of the hopper H or to the plate J, and works in a nut attached to the other of said parts, so that by turning the said screw K in one or the other direction, the said plate J may be adjusted as required.

To the projecting end of one of the journals of the wheel G is attached a crank, L, to the crank-pin of which is pivoted the forward end of the connecting-bar or pitman M, the rear end of which is pivoted to the crank-pin of the crank N, attached to the projecting end of one of the journals of the stirrer-shaft O, the journals of which revolve in bearings in the sides of the hopper H.

The middle part of the shaft O is made square, and upon it is placed a collar, $P^1$, having a rectangular hole or slot formed through it.

The wedge-key $P^2$ is placed in the end of the slot in the collar $P^1$ above or below the shaft O, according as cotton-seed or a fertilizer is to be distributed.

To the lower part of the collar $P^1$ are attached four, more or less, points or fingers, Q, by which the cotton-seed is forced out through the slot in the bottom of the hopper, or the fertilizer in the lower part of the hopper agitated or stirred, so as to pass out freely through the said slot.

One or more other fingers, R, may be attached to the shaft O, upon each side of the collar $P^1$, if desired.

Figure 5:
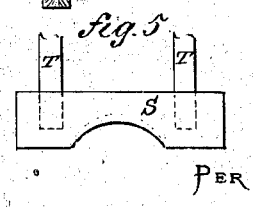
Figure 5 is a detail rear view of the spring coverer.

The seed is covered by the covering-board or plate S, the lower edge of which is concaved, as shown in fig. 5, to give a proper form to the top of the row.

The covering-board or plate S is attached to the rear ends of the springs T, the forward ends of which are attached to the side bars of the frame A.

The springs T should be of such a strength as to hold the board S down with sufficient force to properly cover the seeds, and yet allow the coverer to give or yield, should it encounter an obstruction.

Having thus described my invention,

I claim as new, and desire to secure by Letters Patent—

1. The combination of the sliding plate J and swiveled screw K, with the slotted and concaved bottom I of the hopper H, substantially as herein shown and described, and for the purpose set forth.

2. The combination of the spring coverer S T, with the frame A, and dropping device of a planter, substantially as herein shown and described, and for the purpose set forth.

3. The adjustable agitator P¹ Q P², in combination with the shaft O, hopper H, and slotted bottom I, substantially as herein shown and described, and for the purpose set forth.

4. Securing the furrowing-plow standard D adjustably to the draw-bar B of the frame A, by the notches or teeth $d$, plates E, and wedge-key F, substantially as herein shown and described, and for the purpose set forth.

The above specification of my invention signed by me this 18th day of December, 1869.

HENRY C. HARRIS.

Witnesses:
GEO. W. MABEE,
JAMES T. GRAHAM.